(12) United States Patent
Verma et al.

(10) Patent No.: US 6,976,006 B1
(45) Date of Patent: Dec. 13, 2005

(54) METHOD AND APPARATUS FOR PRESENTING PRICE COMPARISON TO PROSPECTIVE BUYERS

(76) Inventors: Chhedi Lal Verma, 8909 Texas Sun Dr., Austin, TX (US) 78748; Mamta Ganesan, 8909 Texas Sun Dr., Austin, TX (US) 78748

( * ) Notice: Subject to any disclaimer, the term of this patent is extended or adjusted under 35 U.S.C. 154(b) by 0 days.

(21) Appl. No.: 09/659,428

(22) Filed: Sep. 8, 2000

Related U.S. Application Data

(63) Continuation of application No. 09/144,789, filed on Sep. 1, 1998, now abandoned.

(51) Int. Cl.$^7$ ............................................. G06F 17/60
(52) U.S. Cl. ....................................................... 705/27
(58) Field of Search .............................. 705/14, 26, 27

(56) References Cited

FOREIGN PATENT DOCUMENTS

KR          2001067686 A      7/2001    ........... G06F 17/60

OTHER PUBLICATIONS

"CNNfn.com and C2B Technologies Form Strategic Partnership to Create Unique Information and On-Line Shopping Hub." Business Wire. Aug. 18, 1998.*

"C2B Unveils the First Comprehensive Online Shopping Platform for Consumers That Addresses Content, Commerce, Ease-of-Use." PR Newswire. Jul. 27, 1998.*

"Service Merchandise Uses NetDynamics to Move Its Entire Catalog Onto the Internet." Business Wire, p. 03030322. Mar. 3, 1997.*

"Ziff-Davis Signs Up 189 Advertisers for the Coming Launch of Its Computer Shopper NetBuyer Web Site." PR Newswire. P. 0916NEM015. Sep. 16, 1996.*

Atwood, Brent. "Cyberspace: the Last Frontier." Billboard. Vol. 108. No. 13. P.64. Mar. 30, 1996.*

Mazurkiewicz, Greg, "Nothing But New: Useful Internet Sites," Air Conditioning, Heating & Refrigeration News, p. 6, Sep. 29, 1997.*

* cited by examiner

*Primary Examiner*—Susanna M. Diaz
(74) *Attorney, Agent, or Firm*—Horst M. Kasper

(57) ABSTRACT

A method and apparatus designed to facilitate price comparison for products, offered by a plurality of merchants, that are stocked by the merchants in stores that the prospective buyers may personally visit to see and/or touch and/or feel the products. The data from various merchants, comprising details on products including price, is collected into a computer system. A subset of the data is retrieved and organized to present a comparison to the prospective buyers. The method and apparatus of the present invention have applications on the World Wide Web as well as conventional communications systems such as voice telephony.

1 Claim, 6 Drawing Sheets

METHOD AND APPARATUS FOR PRESENTING PRICE COMPARISON TO PROSPECTIVE BUYERS

CROSS-REFERENCE TO RELATED PUBLICATIONS

This application is a continuation of application Ser. No. 09/144,789 filed Sep. 1, 1998 now abandoned.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

The present invention is a method and apparatus for presenting price comparison to prospective buyers by enabling them to inspect a listing, or other visual or audible representation of plural items available for purchase.

Comparing prices and features of products offered by various merchants is a daunting task for prospective buyers because of the multitude of methods employed by merchants to communicate such information. Focus of the present invention is on products that are offered for sale in stores maintained by merchants which the prospective buyers may personally visit to see and/or touch and/or feel the product before making the purchase. Examples of such stores are Sears, Circuit City, Radio Shack, Macys etc. that stock products in various stores. These merchants utilize many different methods and media to communicate the prices and features information to the prospective buyers. One of the methods is to advertise prices and features of products offered for sale, by compiling them in a booklet or flyer to form a sales circular. This sales circular can then be mailed to prospective buyers using mailing lists. Another way is to send the sales circular as part of a newspaper either as an insert/attachment or as an advertisement. Yet another way is to use mass media advertising like TV, radio, or the Internet to communicate all or a part of the sales circular information to the prospective buyers. The sales circular may be part of a booklet published and distributed by an advertising company that displays prices and features for products offered by area merchants. Some merchants print catalogs, containing information on prices and features of products offered for sale, in addition to the above mentioned methods or by itself that can be mailed and/or picked up by the prospective buyers from the merchant stores. Many of these merchants claim to have the lowest prices for products and some even offer to beat the competitors price. Merchants also announce special sales events and distribute coupons that can be used to purchase products for a specific price and/or at a discount to the sales price. Prospective buyers sometimes make personal visits to the stores maintained by the merchants to find out the prices for products.

This abundance of information requires a major effort to collect all data on prices and features of products offered for sale by the merchants. Collecting all such data is made more difficult for the following reasons:

The merchants target their advertising to the area where their stores are located. For example, even for a small state like New Jersey (it is the $5^{th}$ smallest state), Star Ledger has thirteen editions—one for each of the thirteen counties. Monmouth county edition of Sunday Star Ledger does not carry sales circular for Target but Middlesex county edition does. The reason for this is that Target has a store in Middlesex county but not in Monmouth county.

Many merchants mail sales circulars to holders of store credit cards and the prospective buyers that do not carry a store credit card may not receive the sales circular for that store.

Many merchants take people off mailing lists if no purchase is made for a pre-determined period of time.

It's easy to miss advertisements on TV, radio, Internet, or in newspapers.

Many merchants organize middle of the week sales that may be announced in daily newspapers and are missed by those who only subscribe to Sunday newspapers.

Coupons can help bring the cost down but are not easy to find. Many merchants run advertisements on TV or radio but can distribute coupons only by direct mail or newspapers. Some merchants offer coupons on the World Wide Web requiring the prospective buyers to have a color printer and install special software on their computers to download and print coupons. An example of such a website is the website coolsavings.com. When buyers purchase products without the coupons, they end up paying more.

Once the prospective buyers collect all the information they could, they have to organize the data and focus on the product they wish to purchase. This requires still more time and effort. Finally, they have to do the price comparison taking into account all special promotions, coupons, rebates etc. Price comparison is more difficult when the manufactures offer rebates that must be mailed in. It is even more difficult when the manufactures offer rebates and a group of products must be purchased to receive the rebate.

Some merchants bait the prospective buyers by advertising a price for a specific product and then try to switch them to another product when the buyer reaches the store to purchase the product with the excuse that the advertised product is sold out (this is generally referred to as bait and switch.) Sometimes the product may be sold out and the store may offer a raincheck which means either the prospective buyer start the search again (if they really do need the product right away) or they come back to the store when the product is in stock again. This makes the shopping experience very frustrating.

Price and/or feature comparison for some of the products offered for purchase on the World Wide Web (WWW) is available on many WWW websites. The examples of such comparative data can be seen at the following websites: compare.net, bottomdollar.com, top10guide.com, shoppingexplorer.com, shopfind.com, roboshopper.com, jango.com etc. However, these web sites primarily provide comparison for products offered for sale on the WWW and thus provide help to prospective buyers that do online shopping. These websites do not contain comparison data on daily/weekly/monthly sale events advertised by merchants as described above that is the focus of this invention. Website at compare.net provides comparison of product features. Website at www.bottomdollar.com provides comparison for products available on the WWW. Website at top10guide.com provides top ten picks available online for a selection of products available on the WWW. Website at shoppingexplorer.com requires the user to load special software on the computer and searches websites of participating merchants. Website at shopfind.com searches only those sites that allow online purchase through a secure SSL-encrypted connection. Website at roboshopper.com claims to have the fastest way to find best values on the Web. Website at jango.com searches websites of online merchants on the WWW and allows placing an order online.

A majority of prospective buyers currently purchase products that are offered for sale in stores maintained by merchants which the prospective buyers visit to see and/or touch and/or feel the product before they make the purchase. These prospective buyers have to collect data from sales circulars, advertisements, catalogs etc. and rely on themselves to do their comparison shopping. What is desired is a central source that compares all such data for products offered by a plurality of merchants and can present the comparison information to dramatically reduce the effort and time required in doing such comparison.

BRIEF SUMMARY OF THE INVENTION

The present invention helps prospective buyers in shopping for products with the best prices and/or features. The present invention employs a computer system which is linked to databases containing information about products available for sale.

The present invention allows easy price comparison for products that are offered for sale in stores maintained by merchants which the prospective buyers may personally visit to see and/or touch and/or feel the product. The present invention removes all three barriers to price and feature comparison by providing all data, organizing the data to allow easy search for products, and comparing all information including special promotions, coupons, rebates etc. to present the products with the best prices. In addition, the present invention provides the following advantages:

The presentation of comparison data may be for a number of top picks or all the records.

The prospective buyer may choose to compare prices in a different geographical area than their town and/or county and/or state to find the merchant with the best price and/or features.

Many stores offer a thirty day price protection which means if the same product is advertised for less within thirty days of the purchase, the buyer can get a price adjustment. The buyer may continue to check the prices for next thirty days to find out if the same product is advertised for less. This translates to a five fold increase in time and effort that can be potentially saved.

Checking the store inventory before going to the store to pick up the product will cut down on bait and switch. If the store inventory is checked and the product is out of stock, the prospective buyer may decide to go to a different store or a different merchant or may decide to get a raincheck to buy the product at a later time. This cuts down on frustration and allows the prospective buyers to accomplish shopping in a much shorter period of time.

Further objects and advantages of our invention will become apparent from the ensuing description.

DETAILED DESCRIPTION OF THE INVENTION

Figure 1:
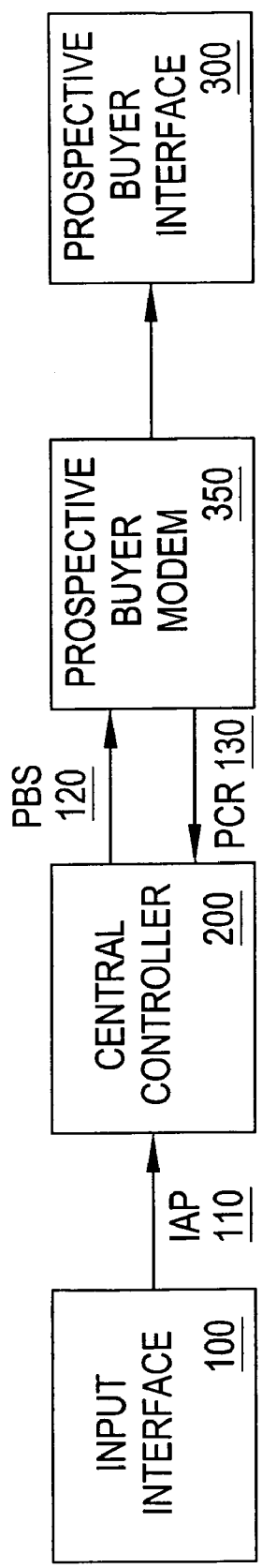
FIG. 1 illustrates a first embodiment of the present invention.
Figure 2:
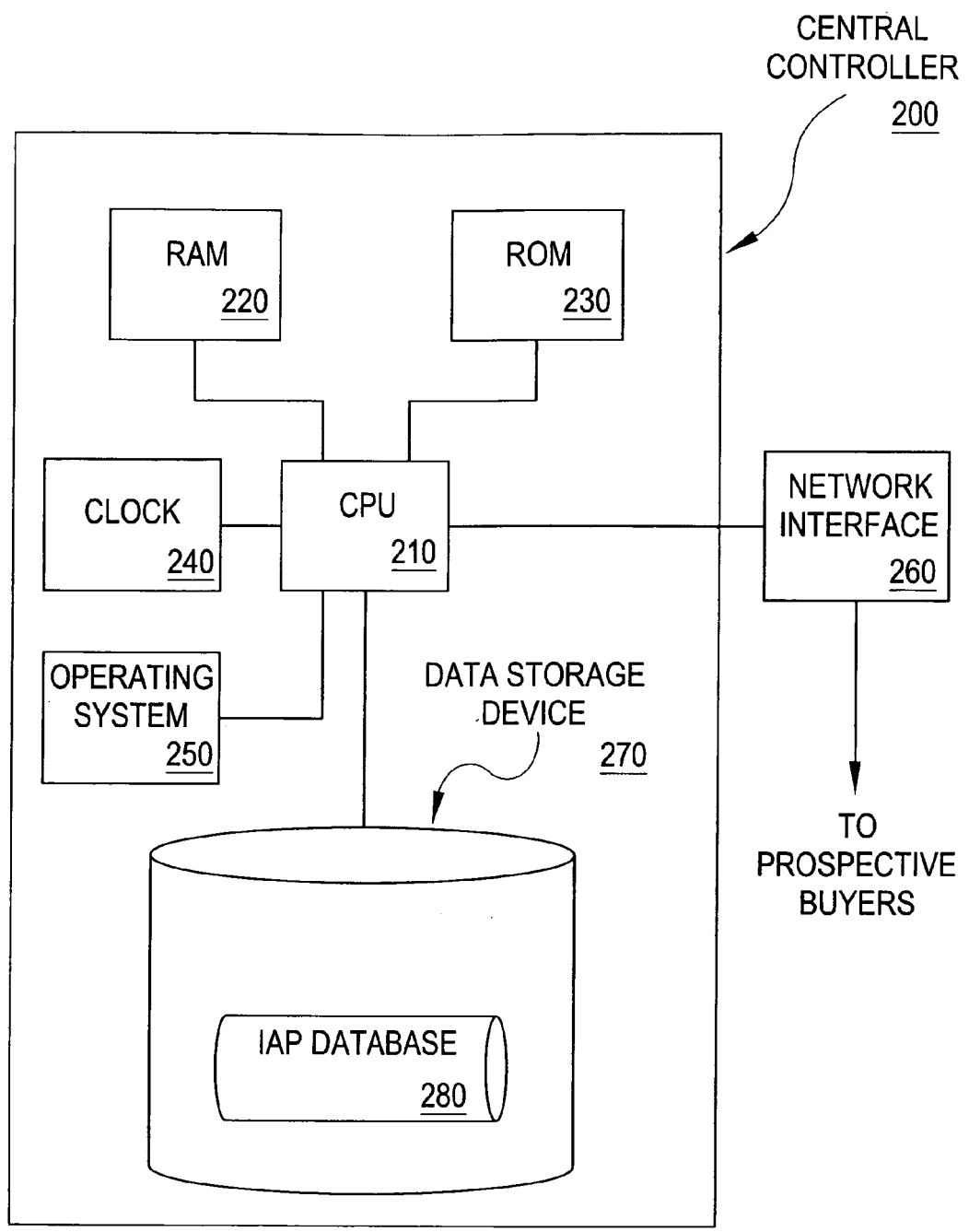
FIG. 2 is a block diagram showing one embodiment of the central controller.
Figure 3:
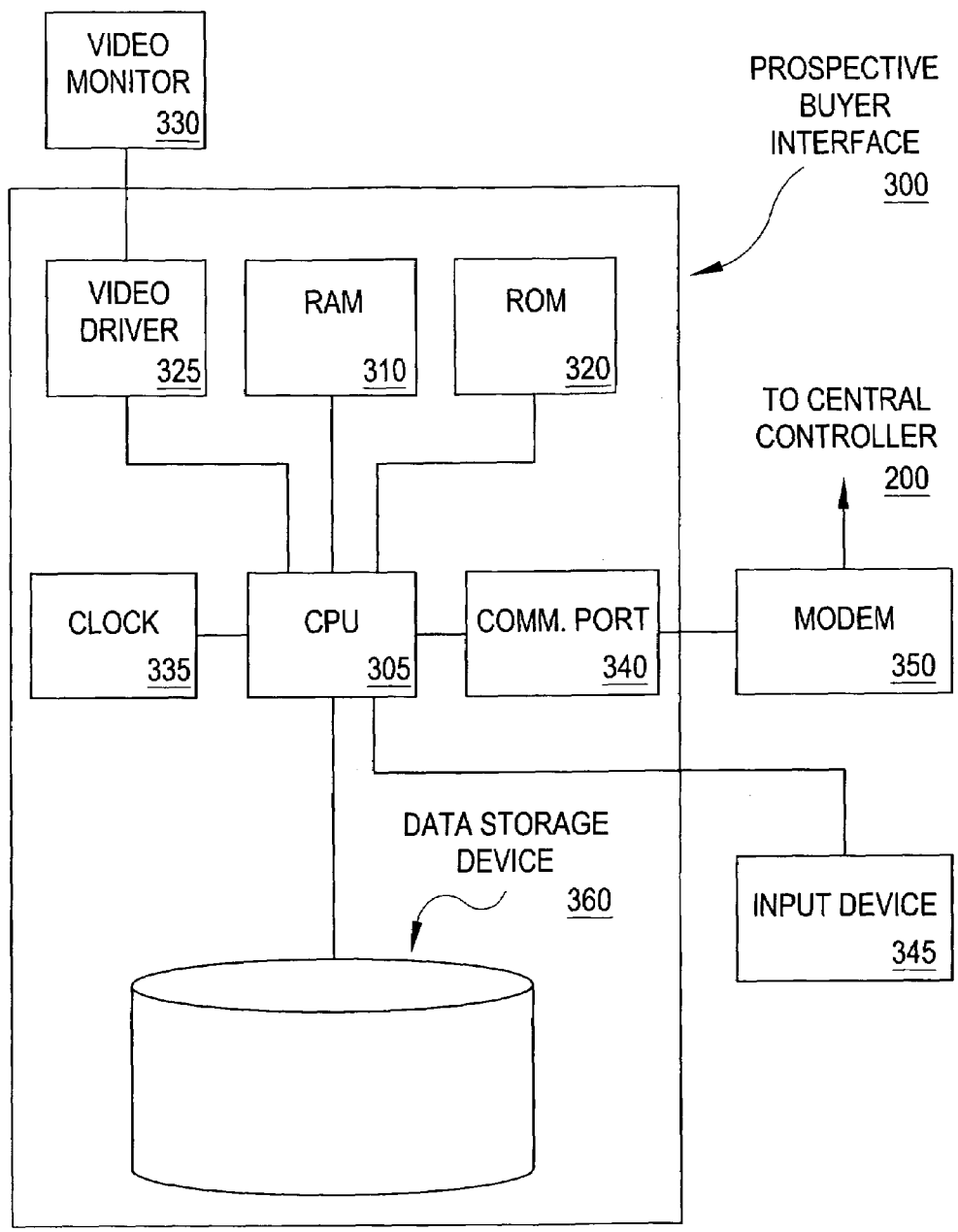
FIG. 3 is a block diagram showing one embodiment of the buyer interface.
Figure 4:
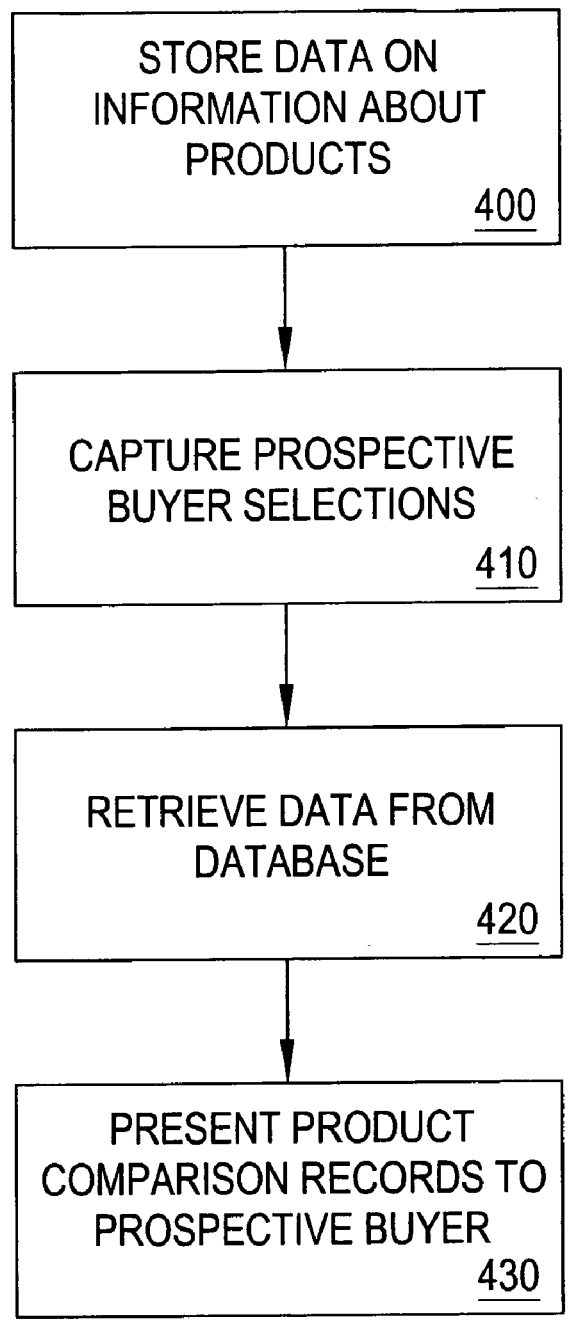
FIG. 4 is a block flow diagram of a method in accordance with the teachings of this invention.
Figure 5:
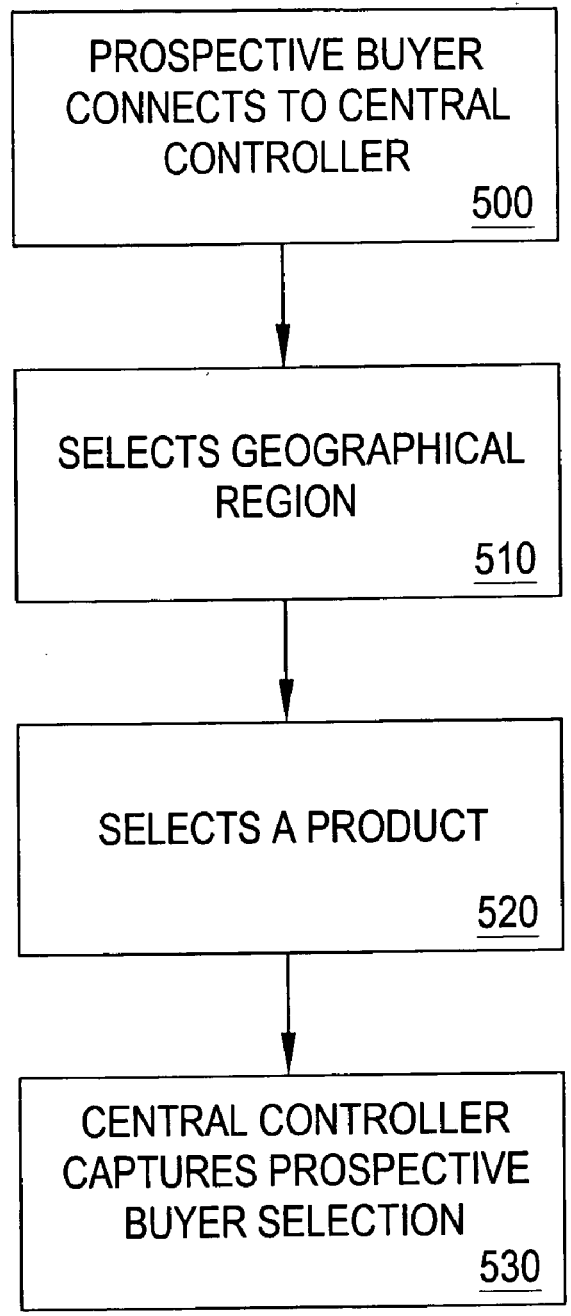
FIG. 5 illustrates an embodiment showing how central controller captures prospective buyer selections.
Figure 6:
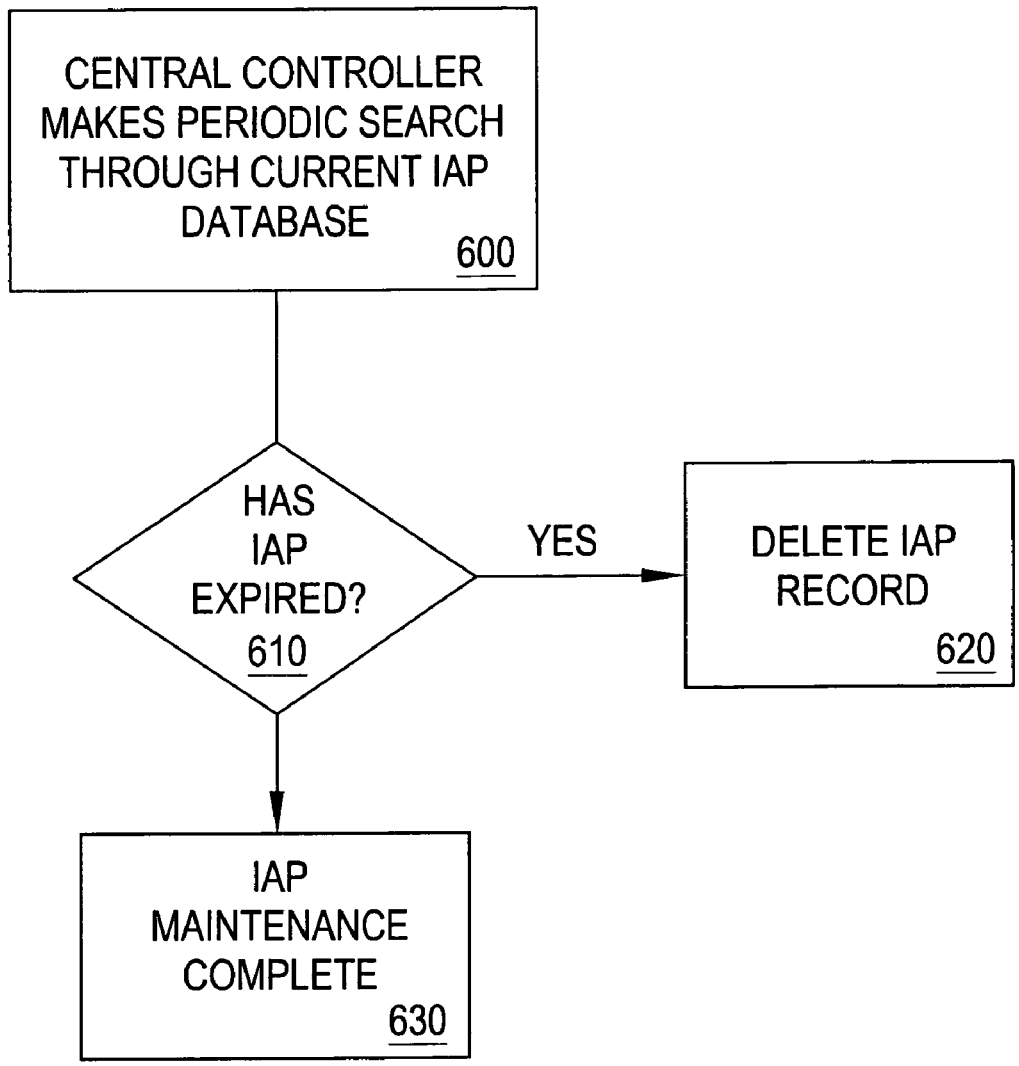
FIG. 6 illustrates one embodiment of the maintenance of information about products.

The data from the merchants is collected into databases that contain information about products including merchant name, product description and/or model number, sales price, coupons/rebates, and other details like regular price, colors etc. This information is changed based on availability of information from the merchants. The frequency of change is dependent on announcements of sales events and may be many times a day, daily, weekly, monthly etc. The data collection can be done by collecting information from all the methods used by the merchants to communicate prices and features information to the prospective buyers. The major source of such information are the sales circulars, advertisements, and catalogs. This information may be collected directly from the merchants or the newspapers in printed or electronic format. The data is stored on storage devices that are part of a single computer system or a network of multiple computer systems.

The data is searched based on a search key. The search key is either explicitly inputted or implicitly derived. The search key will contain at least one of a plurality of attributes. These attributes may be a geographical region, product name, product category, model number, product description, price, product features, brand name etc. These set of attributes are based on the product and may vary from product to product. For example, VCRs always have model numbers while dining tables seldom do. The geographical region may be defined by postal code, town, county, or state either by itself or in a combination that defines one of the attributes of the search key.

The data is retrieved from the database based on the search key and arranged in a sorted order to show comparison. The default order for sort is based on price and the prospective buyer may be provided with the option to sort based on other attributes such as merchant name, product name, model number etc. Each comparison record provides merchant name and details on the product. The input and output interfaces to the apparatus are provided via the World Wide Web, Email, voice telephony, or video telephony.

In a preferred embodiment, data for all merchants offering a specific product (e.g. VCR) in a specific state (e.g. New Jersey) is collected in a database. This data comprises the merchant name, product description, sales price, coupons, and rebates as applicable. This data is stored in a database on a storage device. The prospective buyer is provided access to this apparatus via the World Wide Web through a Browser interface and is presented with options to choose a state and a product. Once the state and product are chosen, the data is retrieved and the prospective buyer is presented with a listing of merchants that offer the product for sale in chosen state. The records in this listing are sorted in ascending order based on sales price and the prospective buyer has the option to sort based on merchant name.

In an alternative embodiment, the data is so organized as to map to a unique address for a geographical area-product combination and a search key is not required to search the data. Thus, the prospective buyers are immediately presented with the comparison data for the unique geographical area-product pair upon connecting to the unique address. For example, a website can be created on the World Wide Web called www.njvcr.com. When the prospective buyers connect to this site using a Browser, they are presented with the comparison data for VCRs that are on sale in New Jersey.

The present invention can be enhanced by checking the inventory at a merchant store local to the prospective buyer to determine availability of the product. In addition, the prospective buyer may be allowed to reserve the product that can be picked up at a local merchant store. This may be further enhanced by inputting a registration token or credit card number that is accepted by the merchant to guarantee the purchase.

Although several embodiments of the present invention has been described above, it would be readily understood by those having ordinary skill in the art that many modifications are possible in the described embodiments without departing from the teachings of the present invention. All such modifications are intended to be encompassed by the claimed invention. For instance, the present invention may be used to present comparison for services offered by merchants. The present invention may also be used to provide features comparison either by itself or in association with the price comparison.

What is claimed is:

1. A method for using a computer for presenting a price comparison to a prospective buyer for products offered for sale by a plurality of merchants, said merchants stocking said products in stores that said prospective buyer may personally visit to see and/or touch and/or feel said products, said method comprising
   collecting information from a plurality of said merchants that comprises data on said products including price;
   storing said data into at least one of a plurality of databases;
   entering a product and a state into the computer by a prospective buyer;
   presenting a plurality of records associated with merchants having local stores in said state wherein the records show a price comparison between the merchants having local stores to said prospective buyer;
   collecting additional information from sales circulars collecting information relating to merchant name, merchant address, product description, model number, regular price, sales price, coupons, rebates, colors, or sizes;
   entering attributes into a search key;
   entering geographical region, postal code, town name, county name, state name, product name, product category, model number, product description, price, product features, or brand name into the search key;
   sorting the database according to model number;
   entering data for merchants offering a specific product in a specific state into said at least one of a plurality of databases, wherein the data includes merchant name, product description, sales price, coupons or rebates;
   providing access to said at least one of a plurality of databases through a browser interface;
   presenting options to the prospective buyer for choosing a state and a product;
   choosing a state and a product by the prospective buyer;
   retrieving the data after the state and product are chosen;
   sorting records in an ascending order based on sales price into a listing;
   presenting the prospective buyer with the listing of merchants offering the product for sale in the chosen state;
   furnishing an option to the prospective buyer to initiate sorting based on a merchant name;
   mapping the data to a unique address for a geographical area-product combination pair;
   connecting to the unique address;
   immediately presenting comparison data for a unique address of a geographical area-product combination pair to the prospective buyer;
   checking inventory at a local store of a merchant upon request of the prospective buyer to determine availability of a chosen product;
   reserving the chosen product at the local store for pickup after determining availability has been performed;
   entering a registration token or a credit card number;
   accepting the registration token or credit card number by the merchant;
   guaranteeing a purchase by the merchant based on the accepting of the registration token or credit card number by the merchant.

* * * * *